United States Patent
Menonna et al.

(10) Patent No.: US 9,249,692 B2
(45) Date of Patent: Feb. 2, 2016

(54) CAMSHAFT AND ASSOCIATE MANUFACTURING METHOD

(75) Inventors: Antonio Menonna, Ditzingen (DE); Falk Schneider, Korntal-Münchingen (DE); Stefan Steichele, Gerlingen (DE)

(73) Assignee: Mahle International GmbH (DE)

( * ) Notice: Subject to any disclaimer, the term of this patent is extended or adjusted under 35 U.S.C. 154(b) by 21 days.

(21) Appl. No.: 13/551,789

(22) Filed: Jul. 18, 2012

(65) Prior Publication Data

US 2013/0019823 A1    Jan. 24, 2013

(30) Foreign Application Priority Data

Jul. 21, 2011   (DE) .......................... 10 2011 079 582

(51) Int. Cl.
| | | |
|---|---|---|
| F01L 1/02 | (2006.01) | |
| F01L 1/047 | (2006.01) | |
| B23P 11/02 | (2006.01) | |

(52) U.S. Cl.
CPC ............... *F01L 1/047* (2013.01); *B23P 11/025* (2013.01); *B23P 2700/02* (2013.01); *F01L 2001/0471* (2013.01); *F01L 2001/0475* (2013.01); *Y10T 29/49293* (2015.01)

(58) Field of Classification Search
CPC .... B23P 11/025; B23P 2700/02; F01L 1/047; F01L 2001/0471; F01L 2001/0475; Y10T 29/49293
USPC ......................... 123/90.15–90.16, 90.27, 90.6
See application file for complete search history.

(56) References Cited

U.S. PATENT DOCUMENTS

| | | | |
|---|---|---|---|
| 4,616,389 A | | 10/1986 | Slee |
| 5,272,930 A | * | 12/1993 | Nakamura et al. ............... 74/434 |
| 5,455,078 A | * | 10/1995 | Kanzaki ......................... 427/446 |
| 6,438,836 B1 | * | 8/2002 | Barth et al. .................... 29/888.1 |
| 6,473,964 B1 | | 11/2002 | Anderson et al. |
| 2003/0000060 A1 | * | 1/2003 | Ichikawa et al. ........... 29/407.01 |
| 2004/0237706 A1 | * | 12/2004 | Merz ............................... 74/567 |
| 2005/0252327 A1 | * | 11/2005 | Shogren et al. .................. 74/431 |
| 2008/0173128 A1 | * | 7/2008 | Vogel et al. ..................... 74/567 |
| 2008/0222889 A1 | | 9/2008 | Asbeck et al. |

(Continued)

FOREIGN PATENT DOCUMENTS

| | | |
|---|---|---|
| DE | 4326768 A1 | 2/1995 |
| DE | 10230542 A1 | 1/2004 |
| DE | 10358351 A1 | 7/2004 |

(Continued)

OTHER PUBLICATIONS

English abstract for DE-102009060352.

(Continued)

*Primary Examiner* — Zelalem Eshete
(74) *Attorney, Agent, or Firm* — Fishman Stewart Yamaguchi PLLC

(57) ABSTRACT

The invention relates to a camshaft for an internal combustion engine with a shaft and at least one cam joined therewith, which is connected via a joining surface on the cam side with a joining surface on the shaft side. The joining surface on the cam side and alternatively or additionally the joining surface on the shaft side may be constructed such that they have a predefined roughness. Hereby, the friction between the shaft and the cam can be increased. The invention further relates to a cam for such a camshaft and a method for the manufacture of such a camshaft or respectively of such a cam.

8 Claims, 2 Drawing Sheets

(56) References Cited

U.S. PATENT DOCUMENTS

| | | | |
|---|---|---|---|
| 2008/0264199 A1* | 10/2008 | Vogel et al. ........................ | 74/567 |
| 2013/0019824 A1 | 1/2013 | Menonna et al. | |

FOREIGN PATENT DOCUMENTS

| | | | |
|---|---|---|---|
| DE | 102007023087 A1 | | 3/2008 |
| DE | 102007012756 A1 | | 9/2008 |
| DE | 102009018406 A1 | | 10/2009 |
| DE | 102009018407 A1 | | 10/2009 |
| DE | 102009018408 A1 | | 10/2009 |
| DE | 102008046167 A1 | | 3/2010 |
| DE | 102009060352 A1 | * | 6/2011 |
| DE | 102009060352 A1 | | 6/2011 |
| GB | 2391274 A | | 2/2004 |

OTHER PUBLICATIONS

German Search Report for DE-102012212625.2.
English abstract for DE-4326768.
English abstract for DE-10358351.
English abstract for DE-102007023087.
English abstract for DE-102008046167.
English abstract for DE-102009018406.

* cited by examiner

CAMSHAFT AND ASSOCIATE MANUFACTURING METHOD

CROSS-REFERENCES TO RELATED APPLICATION

This application is a National Stage application which claims the benefit of German Patent Application No. 102011079582.0 filed on Jul. 21, 2011, which is hereby incorporated by reference in its entirety.

TECHNICAL FIELD

The present invention relates to a camshaft according to the introductory clause of claim 1, and a cam for such a camshaft. The invention further relates to a method for the manufacturing of such a camshaft or respectively of such a cam.

BACKGROUND

Camshafts are a fixed component of several internal combustion engines. The camshaft here has a shaft which is joined with at least one cam. For joining the shaft and the cam, generally thermal joining methods are used. The connection of the shaft and of the cam is ensured here by means of a joining surface on the cam side, which is generally arranged in a cam bore, and a joining surface on the shaft side. A disadvantage here is that the moment which is able to be transferred via the camshaft is limited by the friction between the joining surface on the cam side and the joining surface on the shaft side.

The present invention is therefore concerned with the problem of providing an improved or at least alternative embodiment for a generic camshaft, which is distinguished in particular by an increased transferable moment.

This problem is solved according to the invention by the subjects of the independent claims. Advantageous embodiments are the subject of the dependent claims.

SUMMARY

The present invention is based on the general idea of providing a joining surface on the cam side of a cam of a camshaft, in particular of a commercial vehicle camshaft, and alternatively or additionally a joining surface on the shaft side of the shaft of the camshaft at least partially with a predefined roughening/roughness, i.e. to roughen it. The cam and/or the shaft are therefore constructed such that the surfaces cooperating through the connection of the shaft with the cam, i.e. the joining surface on the cam side and the joining surface on the shaft side, respectively or individually have a predetermined roughening/roughness. The invention utilizes here the knowledge that a friction between the joining surface on the cam side and of the joining surface on the shaft side, responsible for the connection and hence for the holding together of the shaft with the cam, can be increased by the joining surface on the cam side and/or the joining surface on the shaft side being roughened. By the increase in friction between the two joining surfaces therefore the connection between the shaft and the cam is reinforced and thereby the moment which is transferable through the camshaft is increased. A merely drawn and not further processed pipe or else a subsequently processed, in particular turned or ground pipe can be used here as the shaft. With the use of a merely drawn pipe, a tolerance width with regard to the external diameter should lie below 0.07 mm.

Generally here, instead of the cams, any other desired components can also be joined with the shaft in a similar manner.

In accordance with the idea of the invention, an embodiment has a shaft and at least one cam, which are joined with one another via respective joining surfaces. The cam is now constructed such that the joining surface on the cam side is roughened before the joining process. In so doing, the joining surface on the cam side is usually situated within a cam bore of the cam. Alternatively or additionally, the joining surface on the shaft side, i.e. in particular the surface region of the shaft cooperating with the cam, is roughened. Thermal joining methods, for example a shrink fit, usually come into use here as joining methods. However, the joining method per se plays a minor role in the idea of the invention. Other joining variants, for example an adhesive bonding method, therefore likewise lead to the desired result.

In a further embodiment, the joining surface on the cam side is roughened by means of a blasting method. Alternatively or additionally, the joining surface on the shaft side has a predefined roughening/roughness, which is also produced by a blasting method. Preferably, broken glass or respectively broken glass pieces are used here as blasting material in the blasting method for roughening the joining surface on the cam side and/or of the joining surface on the shaft side. Further advantageous forms of the blasting material are cast particles and corundum. A blasting material consisting of a mixture of the previously mentioned blasting materials and of other particulate blasting materials and any other desired mixtures are also conceivable.

In a further preferred embodiment of the invention the joining surface on the cam side and/or the joining surface on the shaft side is/are roughened by means of an optical method. The joining surface on the cam side and/or the joining surface on the shaft side are therefore roughened for example by means of a laser. Joining surfaces on the cam side and/or the joining surfaces on the shaft side are also conceivable which are roughened by means of a chemical, in particular by etching.

It is pointed out that cam shafts which have several such cams, i.e. cams with a predetermined roughening/roughness of the joining surface on the cam side and/or with a predetermined roughening/roughness of the associated joining surface on the shaft side, likewise belong to the scope of this invention. All the joining surfaces on the cam side or respectively all the joining surfaces on the shaft side do not compulsorily have to have such a roughening/roughness. Embodiments are conceivable, in which respectively one of the cooperating joining surface or both cooperating joining surfaces at least of one joining surface are roughened.

As the roughening of the joining surface on the cam side plays a marked effect on the increase of the friction between the cooperating joining surfaces, individual cams, individual cams with the predefined roughening/roughness of the joining surface on the cam side likewise belong to the scope of this invention.

Such camshafts or respectively cams and/or shafts are preferably produced here by the method described by way of example below or respectively the various embodiments of the method.

For example, expediently the joining surface of a cam, i.e. the joining surface on the cam side and/or the joining surface of the shaft, i.e. the joining surface on the shaft side, is roughened. Roughening/roughness values Rz greater than 3 m, in particular Rz greater than 6.3 m prove to be particularly advantageous. For example, a blasting method is used here for example, in which the joining surface on the cam side and/or the joining surface on the shaft side is/are blasted with a blasting material. Broken glass or broken glass pieces are used here for example as blasting material during blasting. In so doing, the blast of the blasting material is directed approximately onto the corresponding joining surface on the cam side and/or onto the joining surface on the shaft side. Embodiments of the method are also conceivable, in which the blast is directed such that the blast and hence the blasting material graze the corresponding joining surface.

As alternative or additional blasting materials, reference is made here by way of example to cast particles and corundum. A mixture of these blasting materials or other blasting materials mixed with these blasting materials can also be used here in the blasting method.

In a further preferred embodiment of the method, the joining surface on the cam side and/or the joining surface on the shaft side are roughened in a targeted manner by the use of electromagnetic waves. Preferably, lasers are used here which provide a high performance and permit a great precision. According to a further advantageous variant of the method, the joining surface on the cam side and/or the joining surface on the shaft side are roughened by the use of chemicals. In such a chemical method, the corresponding joining surface is therefore roughened in particular by etching.

Joining surfaces on the cam side are generally produced in a machined manner by turning. Thereby a twist is produced on the joining surface on the cam side, i.e. a surface structure with a predominant direction. By the production of the predefined roughening/roughness on the joining surface on the cam side, by laser, chemical methods and in particular by a blasting method, a non-directional surface structure is superimposed on the twist. The predominant direction of the surface structure is obliterated entirely or at least partially by the superimposing of non-directional surface structures. Hereby, alongside the predefined roughening/roughness, also a particularly advantageous roughening of the joining surface on the cam side is achieved.

In the production process in addition cams and/or camshafts are frequently provided with a code in order to be able to differentiate the components according to various criteria. Thus, individual measurement values such as measured diameters and/or part numbers and/or batch markings can be introduced into the components. This can be carried out for example by a laser method. The codes can be configured as a sequence of marks and/or a sequence of numbers and/or as a 1-dimensional bar code and/or as a 2-dimensional surface code, in particular as a QR code, and/or as a 3-dimensional code, in which in addition to the surface information also the depth of an individual code point is used as an information plane.

If the codings are only required for the joining method, for example in order to pair the correct individual components such as camshaft and cam, the code can be introduced into the joining surfaces on the cam side and/or into the joining surface on the shaft side, in order to hereby utilize the roughening necessarily occurring by the code to improve the transferable moment between cam and camshaft.

The roughened joining surface on the shaft side or respectively the roughened joining surface on the cam side are now connected with one another according to an advantageous variant of the method by a thermal joining method. Reference is to be made to a shrink fit as an example of such a thermal joining method. In thermal joining methods expediently attention is to be paid to a corresponding dimensioning of the shaft and of the cam, in particular of a cam bore. A joining method is also conceivable, in which the shaft and the cam are glued to one another. Different cams of the camshaft can be connected with the associated shaft here by different methods. Generally, however, joining methods of all kinds belong to the scope of the invention.

It is pointed out that a targeted, predefined roughening of the joining surface on the cam side and/or of the joining surface on the shaft side also through a combination of the method forms described here and a combination of the described method forms with other method variants likewise lead to the desired result and therefore belong to the scope of this invention. It is noted in addition that the improvement, mentioned here, of the connection between the cam and the shaft and the associated method are able to be transferred easily to the connection between the shaft with other joined components.

Further important features and advantages of the invention will emerge from the subclaims, from the drawings and from the associated description of the figures with the aid of the drawings.

It shall be understood that the features mentioned above and to be explained further below are able to be used not only in the respectively indicated combination, but also in other combinations or in isolation, without departing from the scope of the present invention.

BRIEF DESCRIPTION OF THE DRAWINGS

Preferred example embodiments of the invention are illustrated in the drawings and are explained in further detail in the following description, wherein the same reference numbers refer to identical or similar or functionally identical components.

There are shown, respectively diagrammatically.

DETAILED DESCRIPTION

Figure 1:
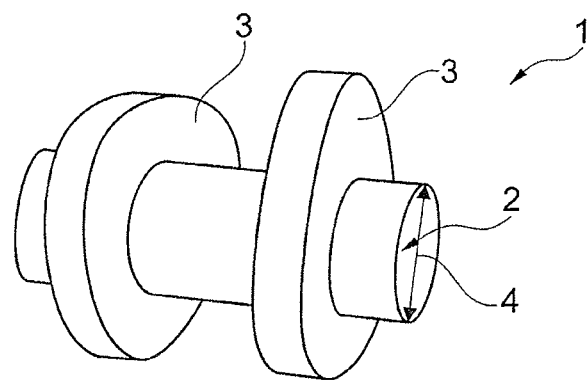
FIG. 1 a perspective view of a camshaft with a shaft and two cams.

In accordance with FIG. 1, a camshaft 1 has a shaft 2 and at least one cam 3. The embodiment shown here comprises two cams 3 here which have an eccentric shape, wherein both cams 3 are constructed identically. The shaft 2 has a cylindrical shape, wherein an external diameter 4 of the shaft 2 is slightly greater than a diameter 5 of a cam bore 6 of the respective cams 3. Thereby, the shaft 2 can be connected with the cam 3 by a thermal joining method, wherein the shaft 2 penetrates the cam bores 6 of the cams 3. Thereby, the shaft 2 and the cams 3 are joined together via respectively a joining surface 7 of the shaft 2 on the shaft side and respectively a joining surface 8 of the cams 3 on the cam side. The respective cams 3 are joined with the shaft 2 here such that they point in different directions with respect to their eccentric shape.

Figure 2:
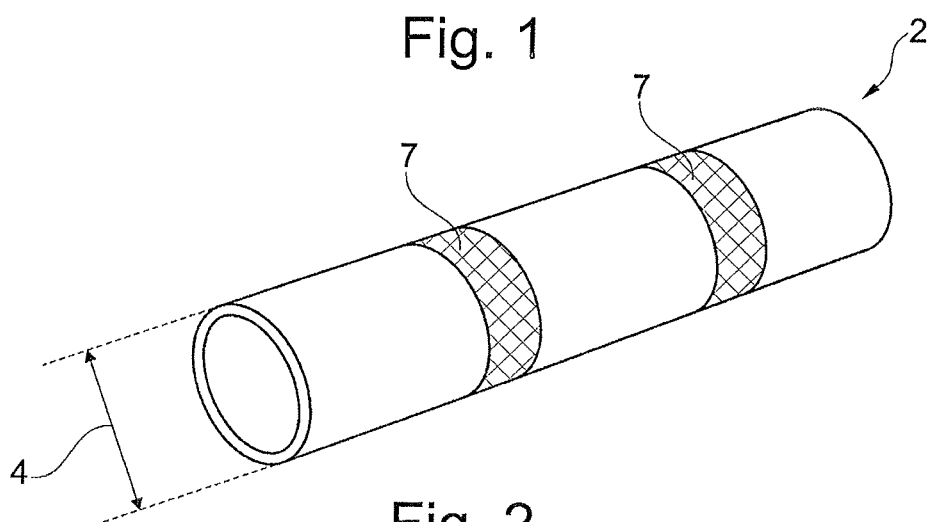
FIG. 2 a perspective view of the shaft.
Figure 3:
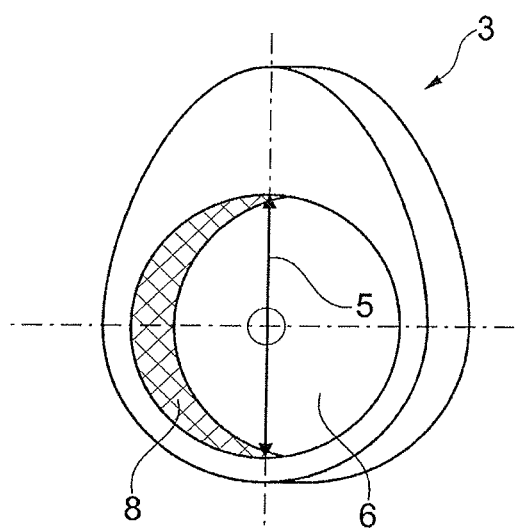
FIG. 3 a side view of a cam.

As shown in addition in FIG. 2, the shaft 2 is constructed such that the joining surfaces 7 on the shaft side, associated with the joining surfaces 8 on the cam side, have a predetermined roughening/roughness 9, which is produced by a targeted roughening of these joining surfaces 7. In addition, the cams 3, as shown by way of example for one of the cams 3 in FIG. 3, are constructed such that their joining surfaces 8 have a predetermined roughening/roughness 9, which is produced by a targeted roughening of these joining surfaces 8. Therefore, the friction between the joining surfaces 7 on the shaft side and the associated joining surfaces 8 on the cam side is increased, which leads to an increase in the torque transmission capability between the shaft 2 and the associated cam 3. Thereby, a maximum moment which is able to be transmitted through the camshaft 1, i.e. in particular a torque or respectively an impulse, is increased.

Figure 4:
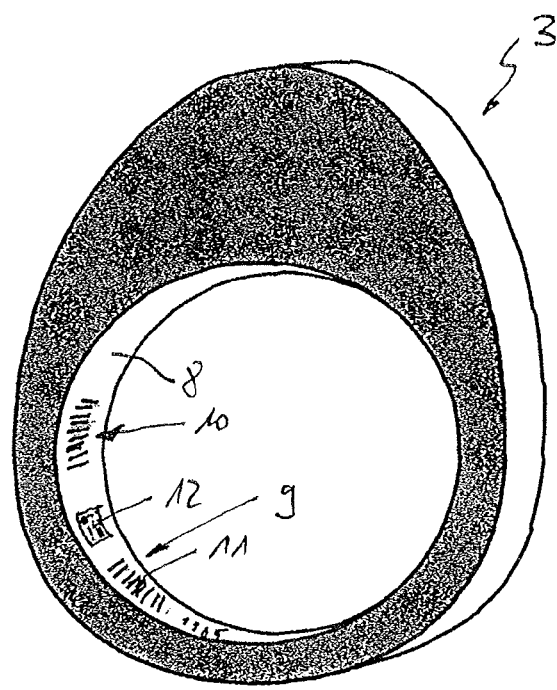
FIG. 4 an oblique view onto a cam with a code lying in the cam joining surface.

FIG. 4 shows a cam 3 with a defined roughening/roughness 9 of the joining surface 8 on the cam side in a further embodiment according to the invention. The roughening/roughness 9 has patterns 10 here, which can carry for example codings 11, 12 with information concerning the cam 3 and in the mounted state on the camshaft 2 between the joining surface 7 on the shaft side and the joining surface 8 on the cam side increase the friction and hence lead to an increase in the torque transmission capability between the shaft 2 and the associated cam 3. The pattern 10 or respectively the codings 11, 12 can form the roughening/roughness 9 here or can also be only a constituent part thereof.

Figure 5:
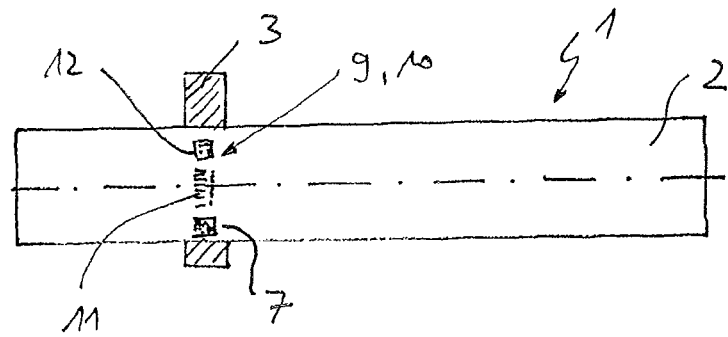
FIG. 5 a view in section of a camshaft with a shaft and a cam and with a code arranged on the shaft joining surface, FIG. 6a,b an illustration of two possible codes.

FIG. 5 shows how these patterns 10, or respectively codings 11, 12 can also be applied on the joining surface 8 on the shaft 2 on the cam side and therefore in addition to the marking function also contributes to an increase in the torque transmission capability.

Figure 6:
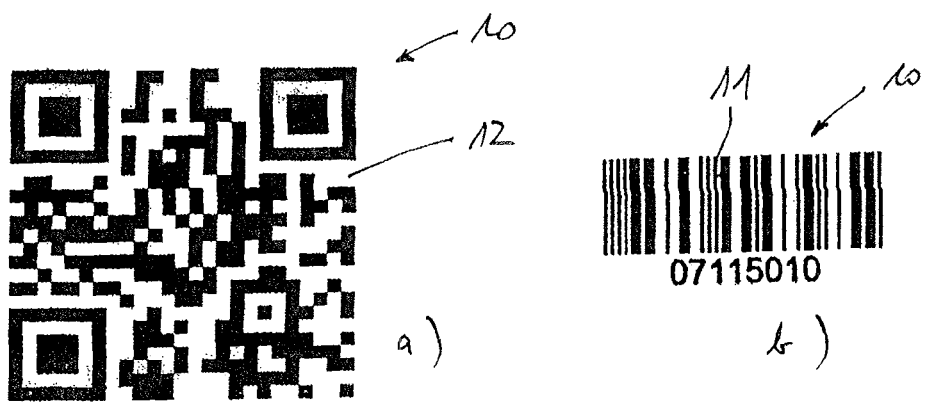

FIG. 6 shows by way of example how such a coding 11, 12 can be configured. In FIG. 6 a) a so-called 2-dimensional QR code 12 is illustrated, which can be provided with any desired information. Likewise, the one-dimensional bar code 11 illustrated in FIG. 6b) can be used for utilization as an information carrier and to increase the torque transmission capability.

Generally, the joining surface 7, 8 on the shaft side and/or on the cam side can be additionally turned or ground before the roughening.

The shaft 2 of the camshaft 1 can either be constructed as a precisely drawn pipe which is not further processed, or as a drawn and subsequently ground pipe. If the shaft 2 is constructed as a drawn pipe which is not further processed, a tolerance of a maximum of +/−0.07 mm is to be maintained on the external diameter 4. Generally, the camshaft 1 can be used in motor vehicles of all kinds, i.e. both in commercial vehicles and also in passenger vehicles. Generally, the shaft 2 can be constructed as a solid shaft or as a hollow shaft, wherein the term "pipe" is not restricted to a hollow shaft, but in principle can also comprise a solid shaft.

The invention claimed is:

1. A camshaft for an internal combustion engine comprising:
a shaft; and
at least one cam thermally joined to the shaft via a joining surface on the at least one cam and a joining surface on the shaft wherein the joining surface on the at least one cam and the joining surface on the shaft each has at least partially a predefined roughening/roughness, at least a portion of which has a defined pattern in the form of a 3-dimensional code that has information about the respective one of the shaft and the at least one cam, and that is configured to increase torque transmission capability between the shaft and the at least one cam;
wherein the joining surface on the at least one cam includes at least one surface structure with a predominant direction, and the predefined roughening/roughness of the joining surface on the at least one cam includes at least one non-directional surface structure,
wherein the at least one non-directional surface structure is superimposed on the at least one surface structure with a predominant direction,
wherein the shaft is a drawn and not further processed pipe having an external diameter with a tolerance of a maximum of +/−0.07 mm, and
wherein a surface and a depth of the 3-dimensional code are each used as an information plane.

2. The camshaft according to claim 1, wherein the predefined roughening/roughness has at least another portion that has a defined pattern in the form of at least one of lettering, a sequence of numbers, a bar code, and a 2-dimensional surface code.

3. The camshaft according to claim 1, wherein the predefined roughening/roughness of the joining surface on the at least one cam and the joining surface on the shaft have a roughness value $Rz>6.3$ μm.

4. A cam thermally joinable with a shaft for a camshaft, the cam comprising a joining surface on an interior surface of the cam, the joining surface having at least one surface structure with a predominant direction and a predefined roughening/roughness that includes at least one non-directional surface structure, wherein the at least one non-directional surface structure is superimposed on the at least one surface structure with a predominant direction, and wherein at least a portion of the predefined roughening/roughness includes a defined pattern in the form of a 3-dimensional code that has information about the cam and that is configured to increase torque transmission capability between the cam and the shaft, wherein a surface and a depth of the 3-dimensional code each being used as an information plane.

5. The cam according to claim 4, wherein the at least one surface structure with a predominant direction includes a twist.

6. The camshaft according to claim 1, wherein the at least one surface structure with the predominant direction includes a twist.

7. A camshaft for a combustion engine comprising:
a shaft; and
at least one cam joined thermally to the shaft by way of a joining surface on the at least one cam to a joining surface on the shaft, the joining surface on the at least one cam having at least one surface structure with a twist;
wherein at least the joining surface on the at least one cam has a predefined roughening/roughness that includes at least one non-directional surface structure superimposed on the twist, and a defined pattern in the form of a 3-dimensional code that has information about the at least one cam and that is configured to increase torque transmission capability between the at least one cam and the shaft, a surface and a depth of the 3-dimensional code each being used as an information plane; and
wherein the shaft is a drawn and not further processed pipe having an external diameter with a tolerance of a maximum of +/−0.07 mm.

8. The camshaft according to claim 7, wherein the predefined roughening/roughness of the joining surface on the at least one cam and the joining surface on the shaft have a roughness value $Rz>6.3$ μm.

* * * * *